United States Patent Office 3,164,784
Patented Jan. 5, 1965

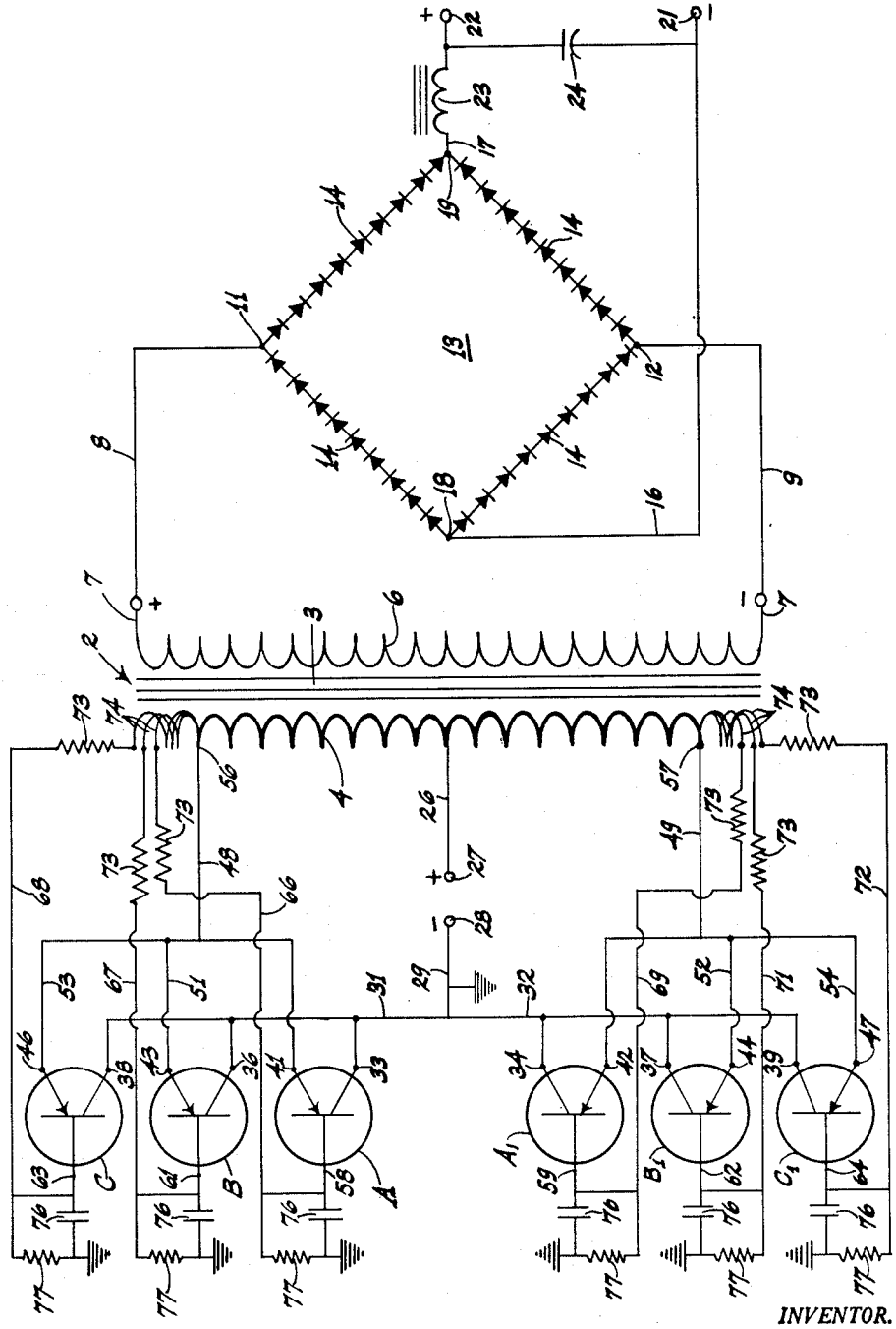

3,164,784
PUSH-PULL OSCILLATOR POWER SUPPLY HAVING PARALLEL-CONNECTED TRANSISTORS
Jo Emmett Jennings, San Jose, Calif., assignor, by mesne assignments, to Jennings Radio Manufacturing Corporation, San Jose, Calif., a corporation of Delaware
Filed Feb. 2, 1960, Ser. No. 6,143
6 Claims. (Cl. 331—113)

My invention relates to transistor power supplies, and more particularly to a device for converting low voltage direct current to high voltage direct or alternating current.

One of the objects of my invention is the provision of a transistorized inverter capable of a power output in proportion to its size which is greatly increased over conventional inverters.

Another object of the invention is the provision of a portable transistorized power supply capable of operating from a twelve volt direct current power source to provide from 100 to over 2000 watts peak output.

Still another object of the invention is the provision of a transistorized power supply utilizing a plurality of pairs of transistors operating in a push-pull parallel configuration.

A still further object of the invention is the provision of a portable transistorized power supply weighing approximately eight pounds and occupying a space of only about 0.6 of a cubic foot.

The invention possesses other objects some of which with the foregoing will be brought out in the following description of the invention. I do not limit myself to the showing made by the said description and the drawings, since I may adopt variant forms of the invention within the scope of the appended claims.

Referring to the drawings:

The figure is a wiring diagram indicating the cooperative relationship of circuit components for providing a filtered high voltage direct current output.

The device of my invention is especially adapted to convert low voltage direct current into either high voltage direct or alternating current, and to accomplish this feat without use of rotating or moving parts in a device which is easily portable and efficient to an exceptionally high degree. The device broadly comprises a transformer having a high permeability core, preferably toroidal in shape, and wound with primary and secondary windings as shown. The secondary winding is connected to a load circuit which determines whether the output will be direct or alternating current. In the event it is desired that the output be direct current, a bridge rectifier and filter are included in the load circuit.

Conductively connected to each end of the transformer primary winding is at least one transistor having three terminals. Two transistors at opposite ends of the primary winding are designated as a pair, and at least two terminals of each transistor of each pair are connected to the associated terminal end of the primary winding. The remaining terminal of each transistor of the pair is connected to the corresponding terminal of the other transistor of the pair. A source of low voltage direct current is provided connected to said primary winding to energize the circuit.

For many years it has been necessary to convert low voltage direct current, such as provided by the ordinary automobile storage battery, into high voltage alternating or direct current. To accomplish this, various mechanisms have been used. For instance, in the category of rotating machinery it has been common to operate a motor from the low voltage source, which in turn mechanically drives a generator supplying the desired high voltage.

In the automobile radio, the vibrator has been used for many years. Sometimes called a chopper because it chops a direct current signal into impulses, the vibrator comprises an oscillating reed energized by an electromagnet.

Where higher direct current source voltages are available, vacuum tube thyratrons may be used as oscillators to produce a high quality alternating wave form. These are limited however by the power loss at low source voltages and are ineffective below about twenty-four volts.

In more recent times, a newcomer to the electronic industry, the transistor, has been utilized to produce inverters capable of approximately 100 watts continuous power output from a twelve volt supply. In conventional transistor inverters the limiting factor has heretofore been the cost of the transistor, since, as the power handling capability of the transistor is increased, the cost of the transistor increases much more rapidly. Also, transistors have not heretofore lent themselves to parallel operating conditions, and have therefore been unsuitable for high power applications.

It was thus to provide a reasonably priced transistor inverter and power supply having high power characteristics that applicant has developed the device disclosed, which is capable of an output ranging upwardly to approximately 2000 watts from a low voltage direct current source.

In more specific terms the transistor inverter and power supply of my invention comprises a transformer designated generally by the numeral 2, and comprising a high permeability toroidal core 3 having primary and secondary windings 4 and 6, respectively, wound thereon. The core conveniently has a one square inch cross-section, and is preferably fabricated from .004" high permeability strip wound steel wire. This construction of the core has been found to provide a core having very high permeability, and with the least magnetic field leakage of any of the conventional cores.

The high voltage secondary windings are wound around the entire core directly on the insulation enclosing the core. If desired, a center or other tap (not shown) may be provided to provide an output proportional to the full voltage. The terminal ends 7 of the secondary windings may be connected directly to a load, or as shown, may be connected into a load circuit including leads 8 and 9, connecting appropriate input terminals 11 and 12, respectively, of a bridge rectifier 13 made up of a plurality of dry metal rectifier units 14, appropriately connected to give full-wave rectification of the alternating secondary output. Leads 16 and 17 connect the rectifier output terminals 18 and 19, respectively, to load terminals 21 and 22.

Since the output of the bridge rectifier comprises an A.C. component superimposed on a D.C. component, and since only a steady D.C. voltage is desired, a filter choke 23 is provided in series with the power supply load and a filter condenser 24 connected across the load. With this arrangement the D.C. component from the rectifier appears across the load, while most of the A.C. component appears across the high inductive reactance of the choke. Because of the low reactance of the output filter condenser 24, only a small amount of A.C. appears across the filter condenser, and since the load is in parallel with the output filter condenser, very little A.C. ripple appears across the load. It will be understood of course that this arrangement is utilized where a high voltage direct current is desired. If a high voltage alternating current is desired, the rectifier and filter may be omitted. It should also be understood that other than dry metal rectifier units may be utilized, and that other than a choke input filter may be used, according to the output characteristics desired.

After appropriate insulation is wound over the high voltage secondary windings, the high current primary winding 4 is wound on the core. This high current winding conveniently comprises approximately 8 to 12 turns of a copper conductor, preferably in the form of a ½″ x .030″ ribbon. Intermediate its ends the primary winding is connected by a heavy lead 26 to the positive terminal 27 of a low voltage source of direct current. Exceptional results have been obtained with as low as a 12 volt source.

The other or negative terminal 28 of the low voltage source is connected by a lead 29 to parallel leads 31 and 32, which serve to connect in parallel the corresponding collector terminals 33–34, 36–37 and 38–39 of a plurality of pairs of transistors $A-A_1$, $B-B_1$ and $C-C_1$. It will thus be seen that in the embodiment illustrated, three pairs of transistors have been provided, connected in a push-pull arrangement in which any practical number of transistor pairs may be multiplied to give extremely high power outputs. Experiments with as many as eight and nine pairs of transistors have demonstrated that high power at efficiencies of over 90% are attainable with my device.

Each transistor of the pairs of transistors $A-A_1$, $B-B_1$ and $C-C_1$ is preferably of the P-N-P type, each having emitter, collector and base terminals, the collector terminals of each of which have already been noted. The emitter terminals 41–42, 43–44 and 46–47 of the pairs of transistors are respectively conductively connected by appropriate leads 48–49, 51–52 and 53–54 to the terminal ends of the primary winding 4. The pairs of transistors are connected in a push-pull arrangement, with emitter terminals 41, 43 and 46 of transistors A, B and C connected in parallel by leads 48, 51 and 53 to one terminal end 56 of the primary winding, and emitter terminals 42, 44 and 47 of transistors $A_1$, $B_1$ and $C_1$ connected in parallel by leads 49, 52 and 54 to the other or opposite terminal end 57 of the primary winding. One emitter terminal of each pair of transistors is thus conductively connected to one terminal end of the primary winding, while the other emitter terminal of the pair is conductively connected to the opposite terminal end of the primary winding.

Also connected conductively to opposite terminal ends 56 and 57 of the primary winding are certain of the transistor base terminals 58–59, 61–62 and 63–64. The base terminals 58, 61 and 63 of transistors A, B and C respectively are connected conductively in parallel by leads 66, 67 and 68 to primary winding terminal end 56, while the base terminals 59, 62 and 64 of transistors $A_1$, $B_1$ and $C_1$ are conductively connected in parallel by leads 69, 71 and 72 to the primary winding terminal end 57. This interconnection between the base terminal of each transistor and the primary winding comprises the base or feedback circuit for each transistor, and is an important element in determining the conductive capacity of each transistor. The amount of feedback to each transistor is effectively controlled by inserting a limiting resistor 73 of approximately 3 ohms in each feedback circuit. Experiments have indicated that the resistance may be varied to as low as ¾ of an ohm. These resistors may conveniently be of the variable variety, or if desired, the optimum resistance desirable in each feedback circuit may be determined by use of a variable resistor and then a resistor having a fixed resistance inserted in its place.

As shown schematically adjacent opposite ends of the primary winding, each feedback circuit also contains a coil 74 comprising three turns or windings wound on the common toroidal core 3 of transformer 2. The wire making up the feedback circuit is preferably of smaller cross-section than the primary. I have found that this arrangement permits paralleling the emitters in a push-pull arrangement, and that since each feedback circuit has the same number of turns about the common core, the transistors are locked together for simultaneous oscillation at the same frequency upon the application of energy from the low voltage source. This arrangement also simplifies construction and reduces the cost of fabricating the core with all of its windings. Additionally, it has been found that this parallel arrangement of emitters and collectors, with separate excitation for the transistor base isolated from the secondary, generates very little heat, even when operating to deliver approximately 2700 volts at 600 watts output more or less, with 12 volts input. The reason, of course, is that since the transistors are connected in parallel, the basic internal resistance of all the transistors collectively, is equal to the quotient of the internal resistance of one transistor divided by the number of transistors used. Thus, if a transistor has a given internal resistance at say a maximum current rating of 15 amperes, connecting the six transistors in parallel in accordance with my invention results in reducing the over-all resistance to ⅙ of that for one transistor, and increases the current rating by a factor of six.

In order to protect the transistors from destructive transient or spurious voltages, a capacitor 76 and a resistor 77 are interposed in parallel between each base or feedback circuit and ground as indicated. These elements function to reduce such destructive voltages and add stability to the circuit. Capacitor 76 ranges from 1½ to 2 mmfd.

Experiments have shown that a transistor inverter constructed in accordance with the foregoing description, but having eight pairs or sixteen transistors, will provide at least 1200 watts from a 12 volt input, with a current load of 120 amperes, and that the device will run cool due to the parallel configuration and at exceptionally high efficiency.

I claim:

1. An electrical power supply comprising a D.C. source having two poles, a semiconductor oscillator, a transformer having a primary and a secondary winding, and a load circuit; the active elements of said oscillator comprising two groups of equal-numbered pluralities of semiconductor devices, said semiconductor devices having control electrodes and corresponding first and second noncontrol electrodes; means connecting said first noncontrol electrodes of said semiconductor devices at a first point, means connecting said second noncontrol electrodes of said semiconductor devices of one of said groups at a second point, and means connecting said second noncontrol electrodes of said semiconductor devices of the other of said groups at a third point; said transformer primary winding comprising a single winding having a centertap and two end terminals; means connecting said first point to one pole of said D.C. source, means connecting the other pole of said D.C. source to said centertap of said primary winding, means connecting said second point to one end terminal of said primary winding, and means connecting said third point to the other end terminal of said primary winding; said transformer secondary being connected to said load circuit; and feedback means connecting the output of said oscillator with each said control electrode, said feedback means comprising a transformer feedback winding corresponding to each said semiconductor device, one end of each said transformer feedback winding being connected to the control electrode of its corresponding semiconductor device, and the other end of each said transformer feedback winding being connected to that end terminal of said transformer primary winding to which is connected a noncontrol electrode of its corresponding semiconductor device.

2. An electrical power supply comprising a push-pull semiconductor oscillator and a transformer having a primary and a secondary winding; the active elements of said oscillator comprising first and second groups of equal-numbered pluralities of semiconductor devices, each said semiconductor device having a control electrode and first and second types of noncontrol electrodes, noncontrol electrodes of said first type in each group being parallel connected and non control electrodes of said second type in each group being parallel connected; said transformer primary winding having first and second ends; a D.C. source connected between a point on said primary winding intermediate said first and second ends and the first type of noncontrol electrode of each semiconductor; the parallel connected second type of electrodes in said first and second groups of semiconductor devices being connected to the first and second ends of said transformer primary winding, respectively, whereby said oscillator develops its output across said transformer primary winding, the power supply output being taken from said transformer secondary winding; feedback means connecting said oscillator output with the control electrode of each said semiconductor device, said feedback means comprising a transformer feedback winding corresponding to each said semiconductor device, one end of each said feedback winding being connected to the control electrode of its corresponding semiconductor device, the other end of each said feedback winding being connected to said transformer primary winding, with all said feedback windings corresponding to semiconductor devices in said first group being connected to said transformer primary winding at said first end and with all said feedback windings corresponding to semiconductor devices of said second group being connected to said transformer primary winding at said second end.

3. The power supply of claim 2 wherein said first and second groups of semiconductor devices are alternately conductive.

4. The power supply of claim 2 further comprising transient suppressing means connected between the control electrode and one noncontrol electrode of each semiconductor device.

5. The power supply of claim 4, wherein said transient suppressing means comprises a resistor and a capacitor connected in parallel combination.

6. The power supply of claim 4 in which said transient suppressing means comprises a capacitor.

References Cited in the file of this patent
UNITED STATES PATENTS

| | | |
|---|---|---|
| 2,883,539 | Bruck et al. | Apr. 21, 1959 |
| 2,915,710 | Schiewe et al. | Dec. 1, 1959 |
| 2,946,022 | Davis | July 19, 1960 |
| 2,948,841 | Locanthi et al. | Aug. 9, 1960 |
| 2,994,840 | Dorsman | Aug. 1, 1961 |
| 3,014,172 | Brunson | Dec. 19, 1961 |
| 3,020,491 | Kurtz | Feb. 6, 1962 |
| 3,051,944 | Smith | Aug. 28, 1962 |

OTHER REFERENCES

"Reliable Design of Transistor Invertors," by J. S. Schaffner; published by Missile Design & Development (June 1959); pages 52–54 relied on.

Article by Pye in Electronic and Radio Engineer, pages 96 to 105, March 1959.